US009667436B2

(12) United States Patent
Linney et al.

(10) Patent No.: US 9,667,436 B2
(45) Date of Patent: May 30, 2017

(54) METHOD AND APPARATUS FOR COMMUNICATING WITH AN ACCESS NODE

(71) Applicant: BRITISH TELECOMMUNICATIONS PLC, London, Greater London (GB)

(72) Inventors: Trevor Philip Linney, London (GB); Philip Antony Everett, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/916,829

(22) PCT Filed: Sep. 4, 2014

(86) PCT No.: PCT/GB2014/000349
§ 371 (c)(1),
(2) Date: Mar. 4, 2016

(87) PCT Pub. No.: WO2015/055975
PCT Pub. Date: Apr. 23, 2015

(65) Prior Publication Data
US 2016/0204956 A1 Jul. 14, 2016

(30) Foreign Application Priority Data
Sep. 9, 2013 (GB) .................................. 1316054.4
May 15, 2014 (EP) .................................. 14250074

(51) Int. Cl.
G06F 15/173 (2006.01)
H04L 12/28 (2006.01)
(52) U.S. Cl.
CPC ...... *H04L 12/2858* (2013.01); *H04L 12/2869* (2013.01)

(58) Field of Classification Search
None
See application file for complete search history.

(56) References Cited

U.S. PATENT DOCUMENTS 6,529,479 B1 * 3/2003 Suzuki ............... H04L 12/2856
370/236.1
6,597,689 B1 * 7/2003 Chiu .................. H04L 12/5601
370/354

(Continued)

FOREIGN PATENT DOCUMENTS

EP 2 451 119 A1 5/2012
EP 2 536 068 A1 12/2012
(Continued)

OTHER PUBLICATIONS

International Search Report for PCT/GB2014/000349, mailed Nov. 10, 2014, 4 pages.
(Continued)

Primary Examiner — Brian Whipple
(74) Attorney, Agent, or Firm — Patterson Thuente Pedersen, P.A.

(57) ABSTRACT

An access network comprises a plurality of access nodes (DSLAMs), a plurality of network access servers (CP BRASs) and an ANCP relay. The access network control relay component relays data between an access node and a plurality of network access servers and includes one or more interfaces and associated functionality in an ANCP listener component for enabling a connection between the relay component and the access node, for transmitting data and/or messages thereover, and an interface (ANCP Agents) for a connection to be made with each of the plurality of network access servers (via ANCP listeners contained within the BRASs) for transmitting ANCP messages thereover; and a mapping database for storing mapping data to determine to which network access server a message should be transmit- (Continued)

ted from the relay component, together with a CP authentication database and a workflow processing component for controlling operation of components within the ANCP relay.

4 Claims, 2 Drawing Sheets

(56) References Cited

U.S. PATENT DOCUMENTS

| | | | |
|---|---|---|---|
| 8,121,126 | B1 | 2/2012 | Moisand |
| 2002/0196793 | A1* | 12/2002 | Samba ............... H04L 29/06 370/401 |
| 2003/0216143 | A1* | 11/2003 | Roese ................ G01S 5/02 455/456.1 |
| 2006/0190570 | A1* | 8/2006 | Booth, III ......... H04L 12/4641 709/220 |
| 2009/0063689 | A1* | 3/2009 | Camille ............. H04L 63/102 709/227 |
| 2009/0263132 | A1 | 10/2009 | Rafel et al. |
| 2010/0131660 | A1* | 5/2010 | Dec ................... H04L 41/0806 709/228 |
| 2010/0180016 | A1 | 7/2010 | Bugwadia et al. |
| 2010/0182983 | A1 | 7/2010 | Herscovici et al. |
| 2010/0202441 | A1 | 8/2010 | Haag et al. |
| 2010/0223164 | A1* | 9/2010 | Fortier ............... G06Q 20/02 705/30 |
| 2012/0122424 | A1 | 5/2012 | Herscovici et al. |
| 2014/0245405 | A1* | 8/2014 | Ye ..................... H04L 61/6059 726/4 |
| 2016/0204956 | A1 | 7/2016 | Linney |
| 2016/0241452 | A1 | 8/2016 | Ringland et al. |

FOREIGN PATENT DOCUMENTS

| | | |
|---|---|---|
| EP | 2 624 507 A1 | 8/2013 |
| GB | 1316053.6 | 9/2014 |
| WO | WO 2007/140337 A2 | 12/2007 |
| WO | WO 2015/033091 A1 | 3/2015 |

OTHER PUBLICATIONS

Written Opinion of the International Searching Authority for PCT/GB2013/000339, mailed Nov. 10, 2014, 10 pages.
International Preliminary Report on Patentability for PCT/GB2013/000339, mailed Dec. 11, 2015, 13 pages.
Bitar N et al: "Applicability of the Access Node Control Mechanism to Broadband Networks Based on Passive Optical Networks (PONs): rfc6934.txt", Applicability of the Access Node Control Mechanism to Broadband Networks Based on Passive Optical Networks (PONS): RFC6934.txt, Internet Engineering Task Force, IETF; Standard, Internet Society (ISOC) 4, Rue Des Falaises CH—1205 Geneva, Switzerland, Jun. 18, 2013 (Jun. 18, 2013), pp. 1-39, XP015095007.
Access Node Control Protocol (ancp), https://datatracker.ietf.org/wg/ancp/charter/, Feb. 25, 2016, 5 pages.
S. Ooghe et al., "Framework and Requirements for an Access Node Control Mechanism in Broadband Multi-Service Networks", RFC 5851 ANCP Framework, May 2010, 47 pages.
S. Wadhwa et al., "Protocol for Access Node Control Mechanism in Broadband Networks Abstract" RFC 6320 ANCP Framework, Oct. 2011, 82 pages.
N. Bitar et al., "Applicability of the Access Node Control Mechanism to Broadband Networks Based on Passive Optical Networks (PONs)", RFC 6934 ANCP in PON-Based Networks, Jun. 2013, 39 pages.
Welch et al., Broadband Forum Technical Report, "TR-207 Layer 2 Control Mechanism for Broadband Multi-Service Architectures part II", TR-207 Issue 1, Nov. 2012, 38 pages.
International Search Report and Written Opinion, for PCT Application No. PCT/GB2014/000390, dated Dec. 9, 2014, 9 pages.
Application and File history for U.S. Appl. No. 15/026,199, filed Mar. 30, 2016. Inventors: Ringland et al.
International Preliminary Report on Patentability for PCT Application No. PCT/GB2014/000349, mailed Dec. 11, 2015, 13 pages.
Mitton, Networking Working Group, *Network Access Server Requirements Next Generation (NASREQNG) NAS Model*, Jul. 2000, 20 pages.

* cited by examiner

METHOD AND APPARATUS FOR COMMUNICATING WITH AN ACCESS NODE

RELATED APPLICATIONS

The present application is a National Phase entry of PCT Application No. PCT/GB2014/000349, filed Sep. 4, 2014, which claims the benefit of GB Application No. 1316054.4, filed Sep. 9, 2013, and which claims the benefit of EP Application No. 14250074.3, filed May 15, 2014, each of which is incorporated herein by reference in its entirety.

TECHNICAL FIELD

Embodiments relate to a method and apparatus for controlling an access node, and in particular to a method and apparatus for controlling an access node which scales well with the number of network access servers which need to communicate with the access node (e.g. in order for the network access servers to control or otherwise interact with the access nodes).

BACKGROUND

IETF's RFC 5851 describes an Access Node Control Protocol (ANCP) by which an Access Node (AN), such as a Digital Subscriber Line Access Multiplexor (DSLAM), can communicate with a Network Access Server (NAS), such as a Broadband Remote Access Server (BRAS). This protocol is useful because at present ANs typically communicate with NASs only very indirectly (e.g. via an element manager which aggregates data from a large number of ANs and then passes this to a centralized management device which determines what actions (if any) should be taken by a corresponding NAS if the collected data from the AN indicates that such action should be taken. For example, if an AN connects to a Customer Premises Equipment (CPE) device at a much lower rate than normal, it may be necessary to quickly inform the corresponding NAS so that it can reduce the maximum rate at which downstream traffic (i.e. from the NAS to the AN) is allowed through the NAS towards the AN.

The indirect nature of the communication between ANs and corresponding NASs severely limits the amount of useful communication which can be carried out between an AN and it's corresponding NAS. ANCP solves this limitation by providing a protocol for direct communication between an AN and its corresponding NAS and thereby permits much more powerful cooperation between an AN and its corresponding NAS.

In view of the main perceived problem addressed by ANCP—namely the indirect nature of communications between an AN and its NAS—ANCP was deliberately designed to facilitate direct communications between an AN and its corresponding NAS. However, the present inventors have identified a flaw in the presently considered proposals for implementing ANCP between ANs and NASs which is that it will not scale well in situations where a single AN needs to communicate with a plurality of different NASs. Such a situation (i.e. where a single AN needs to communicate with a plurality of NASs) can occur where there is regulatory pressure on a network operator to permit plural competing organizations to have access to a single AN for their own separate commercial purposes. One particular problem is that ANCP supposes that a single continuously-open TCP connection will be set up between the AN and its (implicitly single) corresponding NAS. The most straightforward way of extending this approach to a case where an AN needs to communicate with multiple NASs would be to simply set up multiple continuously-open TCP connections—one with each respective NAS. However, this quickly becomes quite burdensome on the AN as the number of NAS's involved increases. Moreover, it requires placing intelligence in the AN to ascertain what information should be sent to what NAS, etc.

There is an alternative to using ANCP where the AN signals the current line speed by appending it to an existing connection establishment protocol—i.e. PPP or DHCP option 82. These are defined in Broadband Forum TR101, however they can only update the NAS when the connection is established, making them unsuitable in more dynamic environments.

SUMMARY

According to a first aspect, there is provided a method of operating an access network comprising at least one access node and a plurality of network access servers, the access node including a plurality of ports each connected to a Customer Premises Equipment (CPE), the method comprising: generating data at the access node for transmission to one of the network access servers; transmitting the data to a relay component together with an access node port identifier; identifying at the relay component one of the plurality of network access servers to which the data should be sent, including determining, from a lookup table stored within the relay component, a Communications Provider (CP) identifier associated with the access node port identifier and the network access server of the plurality of network access servers associated with the CP identifier; generating a message for sending to the identified network access server incorporating the data; and transmitting the generated message to the identified network access server.

An advantage of using a relay (although going contrary to the original design objective of permitting direct communications between an Access Node (AN) and its corresponding Network Access Server (NAS)) is that the AN only needs to maintain a single connection between itself and the relay. Additionally, it becomes possible to take out some of the functionality associated with a requirement to maintain plural connections (especially determining to which of the plurality of connected NASs any particular message should be sent). Taking this approach one step further, additional functionality of the AN could be taken out of the AN and placed into an agent which fully represents the AN (and crucially can continue to do so even if the AN is powered down—e.g. because it is a "reverse-powered" device—i.e. one which takes power from CPE-devices to which it is connected). This approach is described in greater detail in a co-pending application with title "Fiber Network" commonly filed on the same date as the present application by the same Applicant—in that application, the agent is referred to as a Persistent Management Agent (PMA). With such a PMA, the PMA could include the necessary relay functionality to act as the relay itself, or a separate relay could communicate with the PMA in which case communications between the AN and the relay would go via a PMA. Other ways in which the functionality of a relay function may be distributed between different components will occur to persons skilled in the art. For example, a single large relay could serve a large number of ANs, or possibly all ANs (or a large number of, or all, PMAs).

Advantageously the generated message is one in accordance with the Access Network Control Protocol (ANCP) as defined, for example, in IETF's RFC 5851 (the contents of which are hereby incorporated in their entirety by way of reference) or any subsequent updated document defining any subsequent version of the ANCP as may be developed after the priority date of the present application. In some embodiments the data may be sent between the access node and the relay component also in the form of an ANCP message, however in alternative embodiments a more bespoke form of connection may be employed for passing data between the access node and the relay component.

Typically the relay component will be a software module running on a standard piece of computer hardware. As noted above, it may be that a single relay component is associated with a single AN (or PMA) or that a single relay component is associated with a large number of ANs (or PMAs), offering a relay service as a centralized function to a large number of ANs. Solutions intermediate these two extremes are also possible.

Advantageously the action according to the second aspect may include transmitting data from the relay device to the access node. Advantageously, the connections between the relay device and the network access servers are Transmission Control Protocol (TCP) connections. The connection between the access node and the relay device may also be a TCP connection although in alternative embodiments discussed in greater detail below, it may be a more bespoke type of connection. For example if the connection is via a PMA, or if the relay component is formed as part of a PMA, then a bespoke connection can be set up between the AN and the relay component/PMA as described in the "Fiber Network" patent application referred to above. However, where the relay component is included in a PMA, the action dependent upon the received message may be to send an appropriate reply to the sending NAS in response to the received message (for example, if the message is a request for information about the AN, such a request may be able to be answered directly by the PMA without having to trouble the AN at all). If however, the received message is (or includes) a configuration request for the AN that naturally the action should be (or include) to forward on the configuration instruction to the AN.

According to a third aspect, there is provided an access network control relay component for relaying data between an access node and a plurality of network access servers within a broadband access network, the access node including a plurality of ports each connected to a Customer Premises Equipment (CPE), the relay component including: one or more interfaces and associated functionality for enabling a connection to be made between the relay component and the access node, for the transmission of data and/or messages thereover, and for enabling a connection to be made with each of the plurality of network access servers, for the transmission of messages thereover; a receiver for receiving data from the access node together with an access node port identifier; a mapping database for storing mapping data to determine to which network access server a message should be transmitted from the relay component; and a processor for determining, from the mapping database, a Communications Provider (CP) identifier associated with the access node port identifier and the network access server of the plurality of network access servers associated with the CP identifier.

According to a fourth aspect, there is provided an access network comprising a plurality of access nodes, a plurality of network access servers and one or more relay components according to the third aspect of the present invention. In the present specification, the term access node (or AN) refers to a network device, usually located at a service provider central office or exchange, street cabinet, Distribution Point or a box attached to a user's/customer's premises (in an envisioned FTTB deployment using, for example, G.Fast), that terminates access-loop connections from subscribers. Typically such network devices include a modem by which a connection can be set up to a corresponding co-operating modem within the customer's premises via the access loop to the user's/customer's premises. In case the access loop is a Digital Subscriber Line (DSL), this is often referred to as a DSL Access Multiplexer (DSLAM) or a Multi-Services Access Node (MSAN). The term Network Access Server (or NAS) refers to a network device that aggregates multiplexed subscriber traffic from a number of Access Nodes; the NAS plays a central role in per-subscriber policy enforcement and quality of service (QoS); the NAS is often referred to as a Broadband Network Gateway (BNG) or Broadband Remote Access Server (BRAS)—a detailed definition of the NAS is given in the IETF's RFC2881 document, the contents of which are hereby incorporated by reference.

According to a fifth aspect, there is provided a computer program for implementing the method of either the first or second aspect. Further aspects relate to a carrier medium (such as a non-transient medium such as a magnetic or optical storage disk or a solid state storage device, etc.) carrying such a computer program (or a set of processor-implementable instructions, etc.).

BRIEF DESCRIPTION OF THE DRAWINGS

In order that the present invention may be better understood, embodiments thereof will now be described, by way of example only, with reference to the accompanying drawings in which.

DETAILED DESCRIPTION OF EMBODIMENTS

Figure 1:
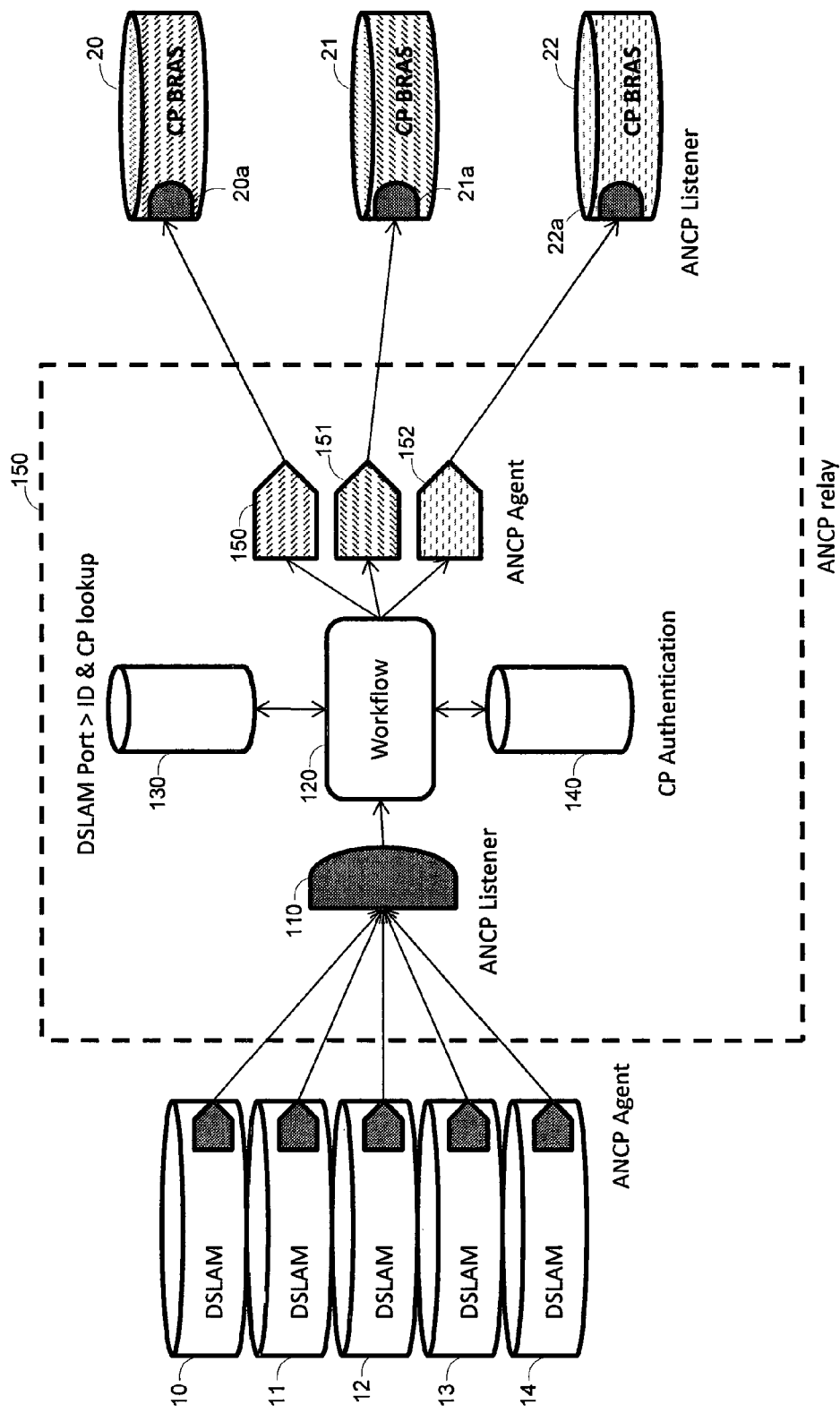
FIG. 1 is a schematic overview block diagram of an access network including a relay component according to a first embodiment.

FIG. 1 gives a schematic overview of a first embodiment of the present invention. As shown, the access network 1 includes a plurality of DSLAM's (access nodes) 10-14 each of which includes an ANCP agent 10a-14a respectively which is responsible for setting up a connection with a corresponding ANCP Listener 110 located within the ANCP relay component 100. The ANCP relay component includes, in addition to the ANCP Listener 110, a workflow processing component 120 whose functionality is described in greater detail below, a DSLAM port to customer user ID and Communications Provider (CP) and BRAS identification lookup table/store 130 (which enables the relay 100 to determine to which BRAS a piece of data or other message from a DSLAM should be sent and to which of the CP's customers the data/message relates, by association of the respective data or message with a port on the DSLAM 10-14 each of which is connected to a particular CPE via a subscriber loop), a CP authentication table/store 140 which permits the relay 100 to authenticate a message received from a BRAS as being genuinely from the CP associated with that BRAS, and a plurality of ANCP agents 150-152 each of which is associated with a respective CP BRAS. The network 1 is additionally shown as including a plurality of CP BRAS's (NAS's) 20-22 each of which includes an ANCP Listener 20a-22a to which a connection is set up by a respective ANCP agent 150-152 in the relay 100.

In this scenario, each DSLAM 10-14 only needs to be aware of the ANCP relay component 100's IP address thus reducing complexity. Furthermore, since the ANCP relay in this embodiment is a software platform (i.e. it is a software construct running on a sophisticated piece of standard computer hardware with a large number of resources), it can scale with the number of CP BRAS's without difficulty and it can isolate each CP BRAS to a single ANCP agent instance 150-152 (so that each BRAS 20-22 effectively sees its own single respective ANCP agent 150-152).

Example Flow:
Start-Up:
  the ANCP relay component 100 connects to each CP BRAS 20-22 and then each CP BRAS 20-22 authenticates itself to the ANCP relay 100 thus authenticating the connections;
  each DSLAM connects to the ANCP relay 100 and authenticates the connection.
State Change
  a DSL line connected to a DSLAM (e.g. DSLAM 10) changes line speed at which it is operating—i.e. the speed of the DSL connection form the DSLAM 10 to the CPE DSL modem (not shown) at the customer's premises (not shown);
  the DSLAM (e.g. DSLAM 10) generates an ANCP event message and sends this to the ANCP relay 100;
  the ANCP event message is received by ANCP relay 100;
  the DSLAM rack/shelf/slot/port identifier is looked up in the identification database 130 to determine the respective "user ID" and "owning CP" (from which in embodiments the correct CP BRAS/NAS 20-22 can be determined—e.g. CP BRAS 22);
  the workflow processing component 120 forwards the change information to the ANCP agent (e.g. ANCP Agent 152) associated with the owning CP;
  ANCP agent generates a new ANCP event message and sends this to the respective CP BRAS (e.g. CP BRAS 22); and
  the respective BRAS ANCP listener (e.g. listener 22a) receives the event and updates the settings on the BRAS accordingly (if necessary e.g. if the line speed has reduced, it may be necessary to throttle back at the NAS/CP BRAS the amount of downstream traffic (i.e. from BRAS 22 towards DSLAM 10 and beyond) permitted to be passed through the respective CP BRAS (e.g. BRAS 22) to the corresponding DSLAM (e.g. DSLAM 10) and beyond ultimately towards a CPE device.

Note that a key advantage of using ANCP is that line rate changes (which may occur after synchronization via a rate adaptation technique such as seamless rate adaption), whilst permitting the associated BRAS to quickly and dynamically respond to such changes.

Thus, in summary, FIG. 1 illustrates an access network 1 which comprises a plurality of access nodes in the form of DSLAMs 10-14, a plurality of network access servers in the form of CP BRASs 20-22 and an ANCP relay 100. The access network control relay component 100 is operable to relay data between an access node 10-14 and a plurality of network access servers 20-22 and includes an interface and associated functionality in the form of an ANCP listener component 110 for enabling a connection to be made between the relay component 100 and the access node 10-14, for the transmission of data and/or messages thereover, and an interface in the form of ANCP Agents 150, 151, 152 for enabling a connection to be made with each of the plurality of network access servers 20, 21, 22 (via ANCP listeners 20a-22a contained within the BRASs 20-22) for the transmission of ANCP messages thereover; and a mapping database 130 for storing mapping data to determine to which network access server a message should be transmitted from the relay component, together with a CP authentication database 140 for permitting a CP to be authenticated and a workflow processing component 120 for controlling the operation of all components within the ANCP relay 100.

Figure 2:
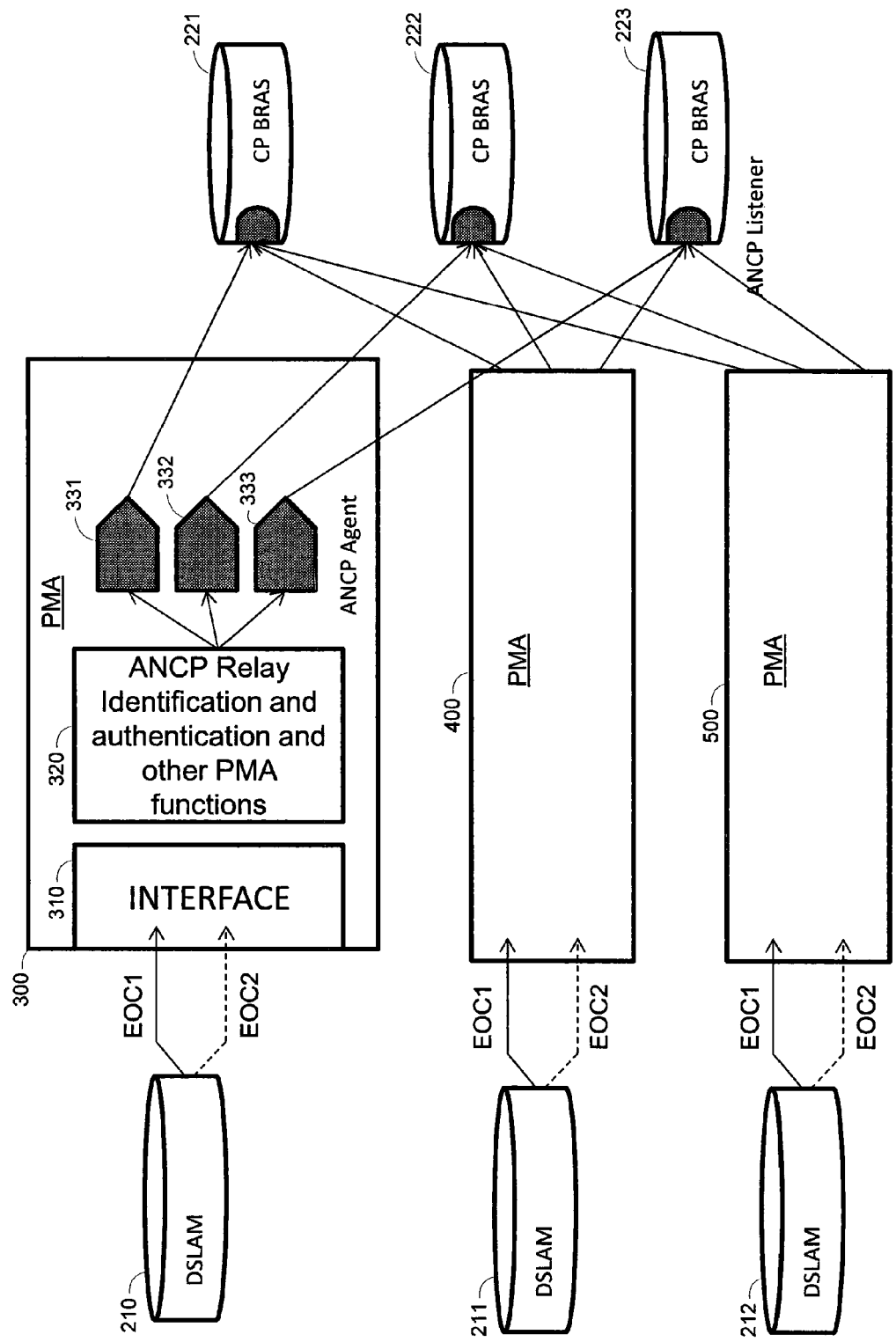
FIG. 2 is a schematic overview block diagram of an access network including a relay component according to a second embodiment.

FIG. 2 shows an alternative embodiment in which rather than having a single centralized ANCP relay component 100 dealing with a plurality of different DSLAMs/ANs, each DSLAM/AN 210-212 (which may for example be a VDSL2 DSLAM forming part of a Distribution Point Unit (DPU)) has its own respective Persistent Management Agent (PMA) 300, 400, 500 which additionally includes an ANCP relay function 320. In this embodiment a special pair of Embedded Operations Channel (EOC) connections EOC1 and EOC2 are used for receiving information from the DSLAMs (ANs) 210-212 on a continuous basis (so long as the DSLAMs/ANs are powered which they may not be if they are "reverse-powered" devices as discussed above). The EOC1 channel contains info directly from the DSLAM/DPU whereas the EOC 2 channel contains info received at the DSLAM/AN from its respective CPE modem device from the EOC between the CPE and the AN. Both of these channels are terminated at a suitable interface 310 within the PMA 300. The main processing portion 320 of the PMA 300 performs the main relay component functions described above with reference to FIG. 2 as well as the other main PMA functions described in the co-pending patent application entitled "Fiber Network" referred to above.

In particular, the processing block 320 performs authentication of the connections to the BRASs/NASs 221-223, and it determines to which BRAS a message should be generated and sent if it obtains via one (or both) of its EOC inputs information which it should pass on to a respective CP BRAS device. A key distinction of this embodiment compared to the first one is that the DSLAMs do not need to have their own ANCP agent. Instead a simple EOC can be used to communicate info between the DSLAMs and their respective PMAs which then create or respond to ANCP messages as appropriate—thus permitting the amount of functionality required to be on the DPU to be reduced compared to the case of the first embodiment.

The invention claimed is:
1. A method of operating an access network comprising at least one access node and a plurality of network access servers, the access node including a plurality of ports each connected to a Customer Premises Equipment (CPE), the method comprising:
  generating data at the access node for transmission to one of the network access servers;
  transmitting the data to a relay component together with an access node port identifier;
  identifying at the relay component one of the plurality of network access servers to which the data should be sent, including determining, from a lookup table stored within the relay component, a Communications Provider (CP) identifier associated with the access node port identifier and the network access server of the plurality of network access servers associated with the CP identifier;

generating a message for sending to the identified network access server incorporating the data; and transmitting the generated message to the identified network access server.

2. An access network control relay component for relaying data between an access node and a plurality of network access servers within a broadband access network, the access node including a plurality of ports each connected to a Customer Premises Equipment (CPE), the relay component comprising:
- one or more interfaces and associated functionality for enabling a connection to be made between the relay component and the access node, for the transmission of data and/or messages thereover, and for enabling a connection to be made with each of the plurality of network access servers, for the transmission of messages thereover;
- a receiver for receiving data from the access node together with an access node port identifier;
- a mapping database for storing mapping data to determine to which network access server a message should be transmitted from the relay component; and
- a processor for determining, from the mapping database, a Communications Provider (CP) identifier associated with the access node port identifier and the network access server of the plurality of network access servers associated with the CP identifier.

3. An access network comprising:
- a plurality of access nodes, each access node including a plurality of ports each connected to a Customer Premises Equipment (CPE);
- a plurality of network access servers; and
- at least one relay component comprising
  - one or more interfaces and associated functionality for enabling a connection to be made between the relay component and the access node, for the transmission of data and/or messages thereover, and for enabling a connection to be made with each of the plurality of network access servers, for the transmission of messages thereover;
  - a receiver for receiving data from the access node together with an access node port identifier;
  - a mapping database for storing mapping data to determine to which network access server a message should be transmitted from the relay component; and
  - a processor for determining, from the mapping database, a Communications Provider (CP) identifier associated with the access node port identifier and the network access server of the plurality of network access servers associated with the CP identifier.

4. A non-transitory computer readable storage medium comprising instructions that, when executed on a processor, cause the processor to implement the method of claim 1.

* * * * *